United States Patent
Atsumori et al.

(10) Patent No.: US 12,488,468 B2
(45) Date of Patent: Dec. 2, 2025

(54) IMAGE PROCESSING APPARATUS AND METHOD FOR HIGHLIGHTING PIXELS BASED ON REGIONAL INTENSITY VALUE DISTRIBUTION

(71) Applicant: Hitachi, Ltd., Tokyo (JP)

(72) Inventors: Hirokazu Atsumori, Tokyo (JP); Stephanie Sutoko, Tokyo (JP); Tsukasa Funane, Tokyo (JP); Ayako Nishimura, Tokyo (JP); Akihiko Kandori, Tokyo (JP)

(73) Assignee: HITACHI, LTD., Tokyo (JP)

( * ) Notice: Subject to any disclaimer, the term of this patent is extended or adjusted under 35 U.S.C. 154(b) by 435 days.

(21) Appl. No.: 18/160,344

(22) Filed: Jan. 27, 2023

(65) Prior Publication Data
US 2023/0306604 A1    Sep. 28, 2023

(30) Foreign Application Priority Data
Mar. 24, 2022 (JP) .................. 2022-048810

(51) Int. Cl.
*G06T 7/11* (2017.01)
*G06T 7/136* (2017.01)
(Continued)

(52) U.S. Cl.
CPC .............. *G06T 7/11* (2017.01); *G06T 7/136* (2017.01); *G06T 7/174* (2017.01); *G16H 30/40* (2018.01);
(Continued)

(58) Field of Classification Search
CPC . G06T 7/11; G06T 7/136; G06T 7/174; G06T 2207/20084; G06T 2207/30016;
(Continued)

(56) References Cited

U.S. PATENT DOCUMENTS

2016/0180525 A1* 6/2016 Reynolds .............. G06T 7/0016
                                                                       382/131
2018/0182481 A1   6/2018 Wakasugi et al.
(Continued)

FOREIGN PATENT DOCUMENTS

JP        2018-102916 A        7/2018

OTHER PUBLICATIONS

Xue, Y., et al., "A multi-path 2.5 dimensional convolutional neural network system for segmenting stroke lesions in 1 brain MRI images," NeuroImage: Clinical 25, 102118 (2020).

*Primary Examiner* — Vincent Rudolph
*Assistant Examiner* — Keely Gwynne Yeargin
(74) *Attorney, Agent, or Firm* — Volpe Koenig

(57) ABSTRACT

An image processing apparatus includes an image acquisition unit acquiring a medical image, a region setting unit setting a peripheral region around an inner region set in the medical image as a region including a lesion, an intensity value ratio distribution calculation unit calculating a histogram comprising a distribution of intensity value ratios for the inner region and calculating a histogram being a distribution of intensity value ratios for the peripheral region, a ratio difference calculation unit that calculates a ratio difference comprising a difference between intensity value ratios in the inner region and peripheral regions for each of predetermined intensity values, an intensity value determination unit selecting a pixel to be highlighted in the medical image based on the ratio difference, and a display processing unit outputting the medical image whereby the pixel selected by the pixel selection unit is highlighted in the medical image to a display device.

7 Claims, 15 Drawing Sheets

(51) Int. Cl.
*G06T 7/174* (2017.01)
*G16H 30/40* (2018.01)

(52) U.S. Cl.
CPC ............... *G06T 2207/20084* (2013.01); *G06T 2207/30016* (2013.01); *G06T 2207/30096* (2013.01); *G06T 2207/30104* (2013.01)

(58) Field of Classification Search
CPC ........... G06T 2207/30096; G06T 2207/30104; G16H 30/40; G16H 30/20; G16H 50/20
See application file for complete search history.

(56) References Cited

U.S. PATENT DOCUMENTS

2019/0026584 A1* 1/2019 Hirai .................... A61N 5/1049
2021/0125334 A1* 4/2021 Lotter ................... A61B 6/025

* cited by examiner

IMAGE PROCESSING APPARATUS AND METHOD FOR HIGHLIGHTING PIXELS BASED ON REGIONAL INTENSITY VALUE DISTRIBUTION

CROSS-REFERENCE STATEMENT

The present application is based on, and claims priority from, Japan Application Serial Number 2022-048810, filed Mar. 24, 2022, the disclosure of which is hereby incorporated by reference herein in its entirety.

BACKGROUND

Technical Field

The disclosure relates to a technique of an image processing apparatus and an image processing method.

Related Art

In order to specify a lesion of cerebral infarction or the like in a black-and-white contrast organ image including that of a brain, diagnosis of an experienced medical specialist or the like is currently required. In addition, work of putting a mark (color painting) on the image on the basis of this diagnosis is performed manually and is therefore cumbersome.

As a technique for simplifying such work, Japanese Unexamined Patent Application Publication No. 2018-102916 discloses a control method, an information terminal, and a program in which "In a case where a lesion included in a designated target image is a texture type lesion, a probability image calculation unit 102 calculates for each pixel of the designated target image a probability value that the pixel is included in a lesion region. From a probability image acquired from the probability image calculation unit 102, an output unit 103 calculates a region that consists of pixels having a probability value equal to or greater than a first threshold as a candidate region, and calculates a region that consists of pixels having a probability value within a predetermined probability range including the first threshold as a correction region. An input unit 104 detects an input that is made by a user, by operating an operating device, to the pixel of the correction region displayed on a display by the output unit 103. A lesion region specification unit 105 specifies the lesion region on the basis of the probability image acquired from the probability image calculation unit 102, the candidate region and the correction region acquired from the output unit 103, and user operation information acquired from the input unit 104" (see ABSTRACT).

In addition, a literature by Xue, Y., et al. ("A multi-path 2.5 dimensional convolutional neural network system for segmenting stroke lesions in brain MRI images", NeuroImage: Clinical 25, 102118 [2020]; hereinafter "Non-Patent Literature 1") describes a technique related to lesion determination by convolutional neural network (CNN).

As described above, a (half) automatic lesion determination technique using a predetermined threshold of intensity data on the image and a (half) automatic lesion determination technique by machine learning using a large number of images have been proposed so far. However, in general, determination accuracy (performance) of these techniques for specifying a lesion is only 60% to 80%, which is not high.

SUMMARY

An image processing apparatus according to an embodiment of the disclosure includes: a region setting unit, an intensity value frequency distribution calculation unit, a difference value calculation unit, a pixel selection unit, and an output processing unit. The region setting unit is configured to set, for a first region set in a first image as a region including a region of interest in the first image, a second region in the first image, the second region being a region that is in the vicinity of the first region and that does not include the region of interest and the first region. The intensity value frequency distribution calculation unit is configured to calculate a first intensity value frequency distribution that is information related to distribution of a number of pixels having a predetermined intensity value for the first region and calculate a second intensity value frequency distribution that is information related to distribution of a number of pixels having a predetermined intensity value for the second region. The first intensity value frequency distribution and the second intensity value frequency distribution are distribution across a plurality of predetermined intensity values. The difference value calculation unit is configured to calculate a difference value between the first intensity value frequency distribution and the second intensity value frequency distribution for each of the plurality of predetermined intensity values. The pixel selection unit is configured to select a pixel to be highlighted in the first image on the basis of the difference value. The output processing unit is configured to output, to an output unit, a second image in which the pixel selected by the pixel selection unit is highlighted for the first image.

DETAILED DESCRIPTION

Figure 1:
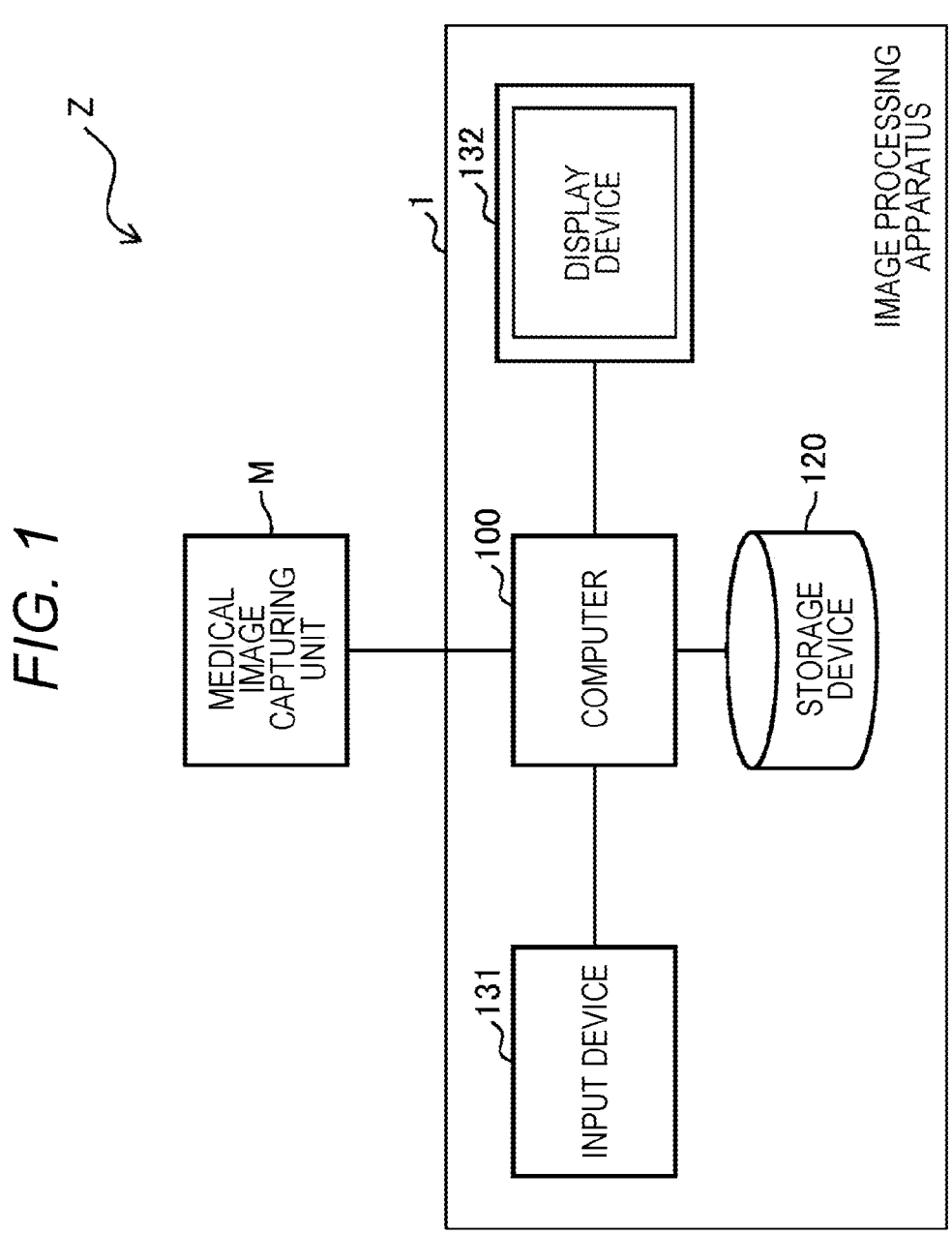
FIG. 1 is a diagram illustrating a configuration example of an image processing system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Next, an embodiment for carrying out the disclosure will be described in detail with reference to the drawings as appropriate.

The present embodiment can be applied to two-dimensional or three-dimensional images such as X-ray computed tomography (CT), magnetic resonance imaging (MRI), positron emission tomography (PET), and single photon emission computed tomography (SPECT). In the present embodiment, an example in which the disclosure is applied to a two-dimensional image will be described.

System

FIG. 1 is a diagram illustrating a configuration example of an image processing system Z according to the present embodiment.

An image processing system Z includes a medical image capturing unit M and an image processing apparatus 1 that processes an image captured by the medical image capturing unit M. The medical image capturing unit M captures an image by using X-ray CT, MRI, PET, SPECT, or the like (hereinafter, referred to as a medical device). The image processing apparatus 1 acquires an image (referred to as a medical image 201 [see FIG. 6]) taken by the medical device from the medical image capturing unit M.

The image processing apparatus 1 performs lesion highlighting processing of highlighting a lesion in the medical image 201. The image processing apparatus 1 includes a computer 100, a storage device (storage) 120, an input device (input unit) 131, and a display device (output unit) 132. Details of the computer 100 will be described later. The storage device (storage) 120 includes a hard disk drive (HDD), a solid state drive (SSD), or the like, and stores the medical image 201 acquired from the medical image capturing unit M and information such as a threshold to be described later. Although in the example illustrated in FIG. 1, the storage device (storage) 120 is integrated with the image processing apparatus 1, the storage device (storage) 120 may be a device different from the image processing apparatus 1 and may for example be a database or the like. The input device 131 includes a mouse, a keyboard, and/or the like. The display device 132 is a display.

Computer 100

Figure 2:
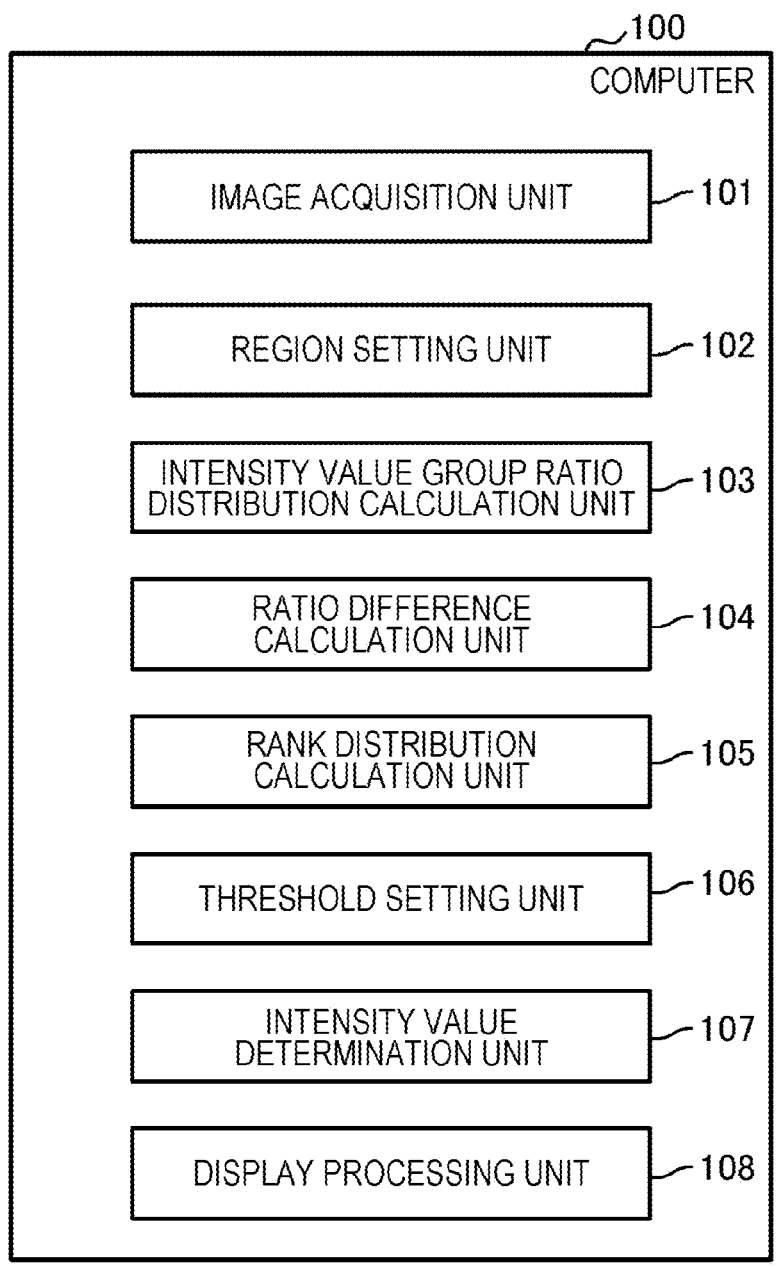
FIG. 2 is a diagram illustrating a configuration of a computer according to an embodiment.

FIG. 2 is a diagram illustrating a configuration of the computer 100 according to the present embodiment. Reference to FIG. 1 will be made when appropriate.

The computer 100 includes an image acquisition unit 101, a region setting unit 102, an intensity value group ratio distribution calculation unit (intensity value frequency distribution calculation unit) 103, and a ratio difference calculation unit (difference value calculation unit) 104. The computer 100 further includes a rank distribution calculation unit (pixel selection unit) 105, a threshold setting unit (pixel selection unit) 106, an intensity value determination unit (a pixel selection unit) 107, and a display processing unit (an output processing unit) 108.

The image acquisition unit 101 acquires the medical image 201 (see FIG. 6) from the storage device (storage) 120.

The region setting unit 102 sets an inner region 212 (see FIG. 6) and a peripheral region 222 (see FIG. 6), which will be described later, in the medical image 201.

Figure 8:
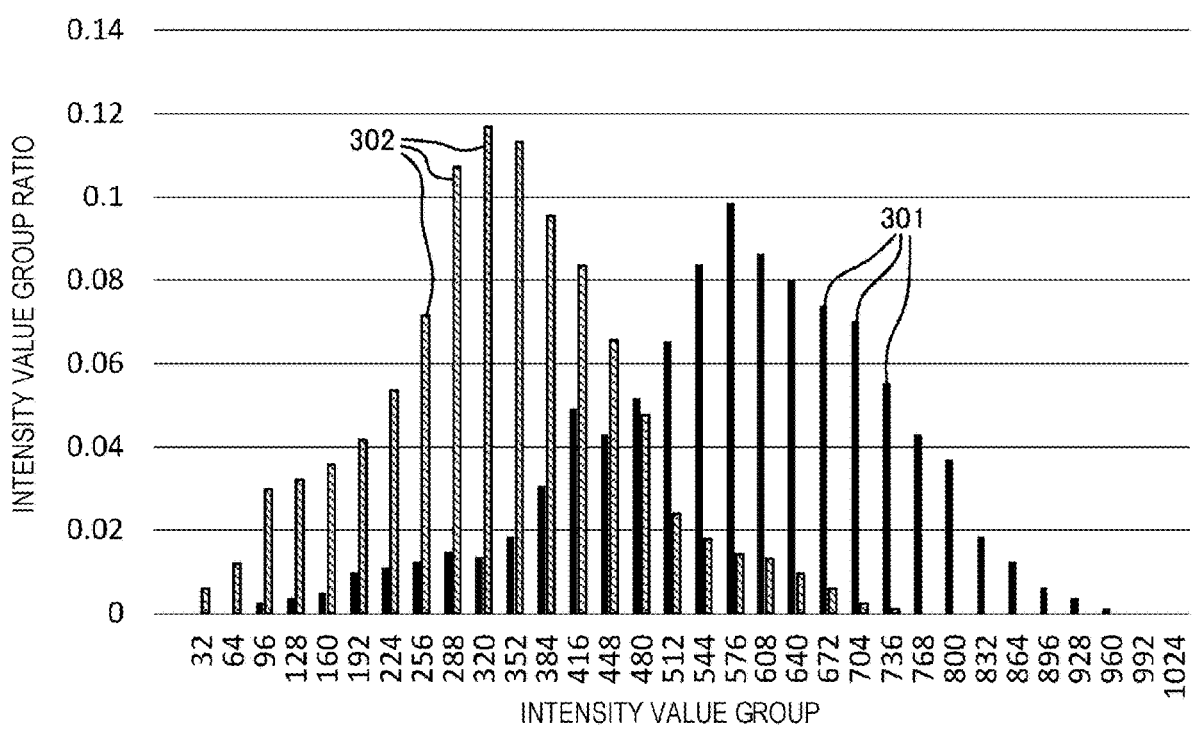
FIG. 8 is a diagram illustrating an example of the intensity value group ratio distribution in the inner region and the peripheral region.

The intensity value group ratio distribution calculation unit 103 calculates histograms 301 and 302 (see FIG. 8). Histograms 301 and 302 are a first intensity value frequency distribution and a second intensity value frequency distribution, which are information related to distribution of the number of pixels having a predetermined intensity value for the inner region 212 and peripheral region 222 that have been set. The histograms 301 and 302 will be described later.

The ratio difference calculation unit 104 calculates ratio differences (difference values) obtained by subtracting the histogram 301 and the histogram 302 respectively from intensity value groups. The intensity value group and the ratio difference will be described later.

The rank distribution calculation unit 105 calculates a ratio difference rank distribution 330b (see FIG. 12) by sorting the ratio differences in ascending order.

The threshold setting unit 106 sets a predetermined threshold to the ratio difference rank distribution (difference rank distribution) 330b.

The intensity value determination unit 107 determines an intensity value to be highlighted on the basis of the ratio difference rank distribution 330b and the set threshold.

The display processing unit 108 displays, on the display device 132, a medical image 201A in which pixels corresponding to the intensity value determined by the intensity value determination unit 107 are highlighted.

Note that the intensity value is a signal intensity value that is measured by the medical device such as X-ray CT, MRI, PET, or SPECT and is outputted as a brightness value in the display device 132 (see FIG. 1).

Hardware Configuration of Computer 100

Figure 3:
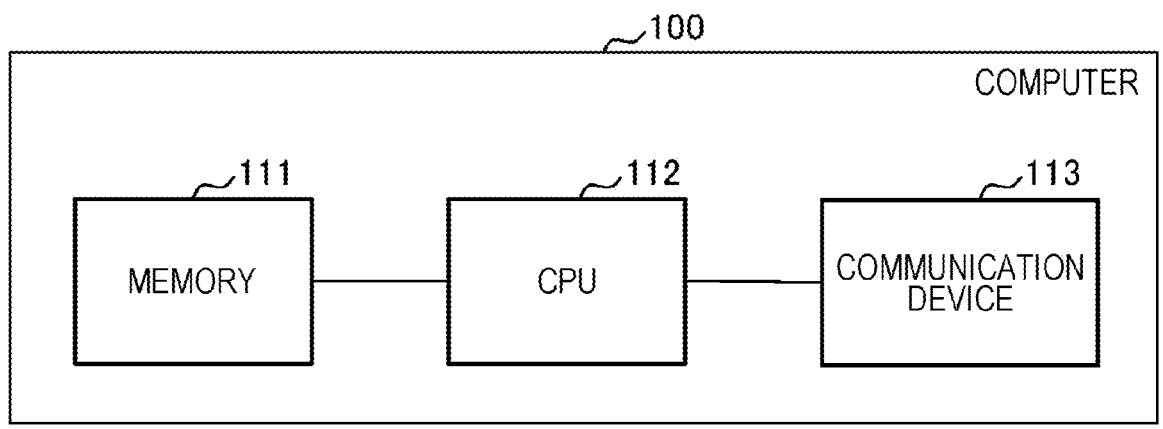
FIG. 3 is a diagram illustrating a hardware configuration of a computer.

FIG. 3 is a diagram illustrating a hardware configuration of the computer 100.

As illustrated in FIG. 3, the computer 100 includes a memory 111 including a random access memory (RAM) or the like, a central processing unit (CPU) 112, and a communication device 113.

Each of the units 101 to 108 illustrated in FIG. 2 is realized by loading a program stored in the storage device (storage) 120 (see FIG. 1) into the memory 111 and executing it by the CPU 112. The communication device 113 transmits and receives information to and from the medical image capturing unit M (see FIG. 1).

Flowchart

Figure 4:
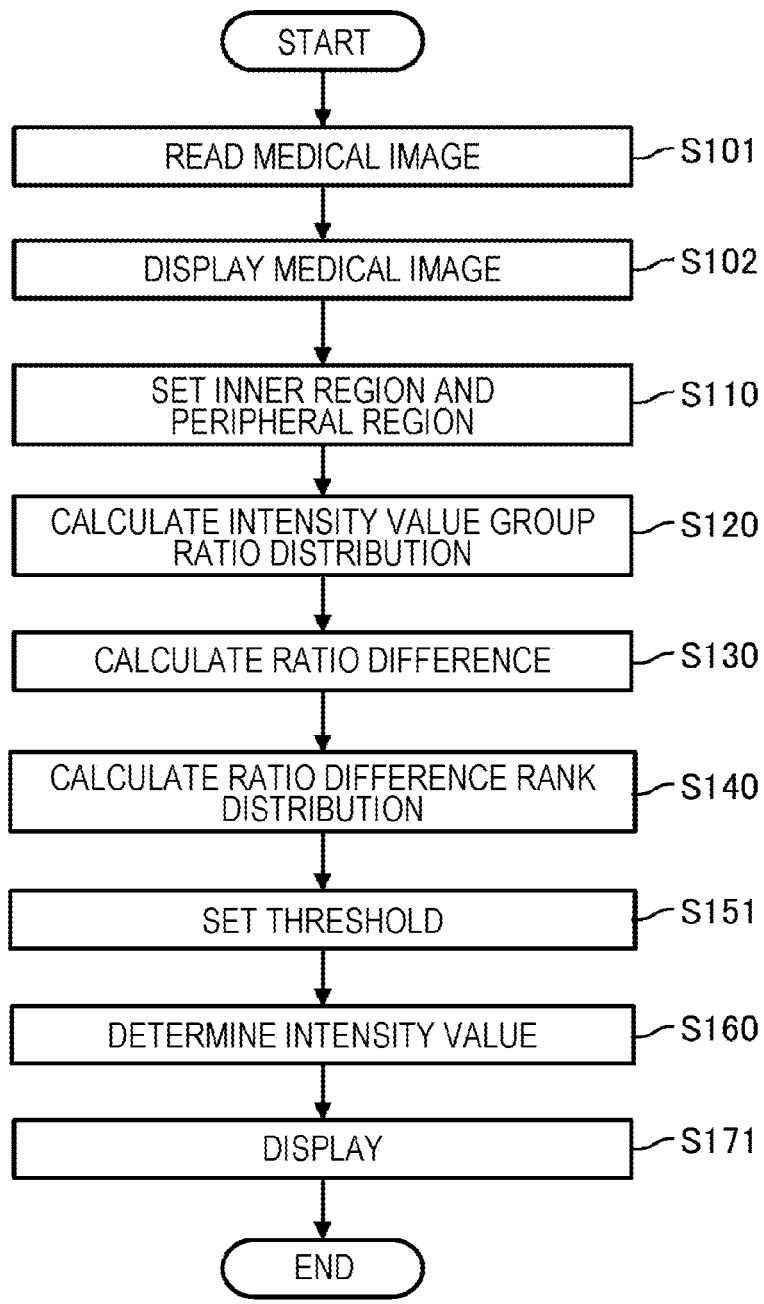
FIG. 4 is a flowchart illustrating a procedure of lesion highlighting processing performed by the computer according to an embodiment.

FIG. 4 is a flowchart illustrating a procedure of lesion highlighting processing performed by the computer 100 according to the present embodiment. Reference to FIG. 2 will be made where appropriate.

First, the medical image 201 (see FIG. 6) captured by the medical image capturing unit M by using a medical device (the medical device takes the medical image 201) is acquired by the image processing apparatus 1 and then stored in the storage device (storage) 120.

Then, the image acquisition unit 101 reads the medical image (a first image) 201 (see FIG. 6) stored in the storage device (storage) 120 (S101).

Subsequently, the display processing unit 108 displays the medical image 201 read into the display device 132 (S102).

Thereafter, the region setting unit 102 sets the inner region (a first region) 212 (see FIG. 6) and sets the peripheral region (a second region) 222 (FIG. 6) on the basis of the set inner region 212 (S110: region setting step). Processing of step S110 will be described later.

Next, the intensity value group ratio distribution calculation unit 103 calculates an intensity value group ratio distribution for the inner region 212, and further calculates an intensity value group ratio distribution for the peripheral region 222 (S120: intensity value frequency distribution calculation step). The intensity value group ratio distribution will be described later.

Then, the ratio difference calculation unit 104 calculates the ratio difference on the basis of the intensity value group ratio distribution (S130: difference value calculation step). The ratio difference will be described later.

The rank distribution calculation unit 105 calculates the ratio difference rank distribution 330b (see FIG. 12) on the basis of the ratio difference (S140: pixel selection step). The ratio difference rank distribution 330b will be described later.

Subsequently, the threshold setting unit 106 sets a threshold to the ratio difference rank distribution 330b (S151: pixel selection step).

Then, the intensity value determination unit 107 determines the intensity value to be highlighted on the basis of the threshold set in the ratio difference rank distribution 330b (S160: pixel selection step). Processing of step S160 will be described later.

Although details will be described later, through steps S140, S151, and S160, a pixel in the medical image 201 that is to be highlighted is selected on the basis of the ratio difference.

Subsequently, the display processing unit 108 displays (outputs), on the display device 132, a medical image 201A (see FIGS. 14 and 15) in which the pixel selected by the intensity value determination unit 107 is highlighted for the medical image 201 (S171: output step).

Setting of Inner Region 212 and Peripheral Region 222: S110 of FIG. 4

Next, setting of the inner region 212 and the peripheral region 222 (S110 of FIG. 4) will be described with reference to FIG. 5 while referring to FIG. 4. Reference to FIG. 2 will be made where appropriate.

Figure 5:
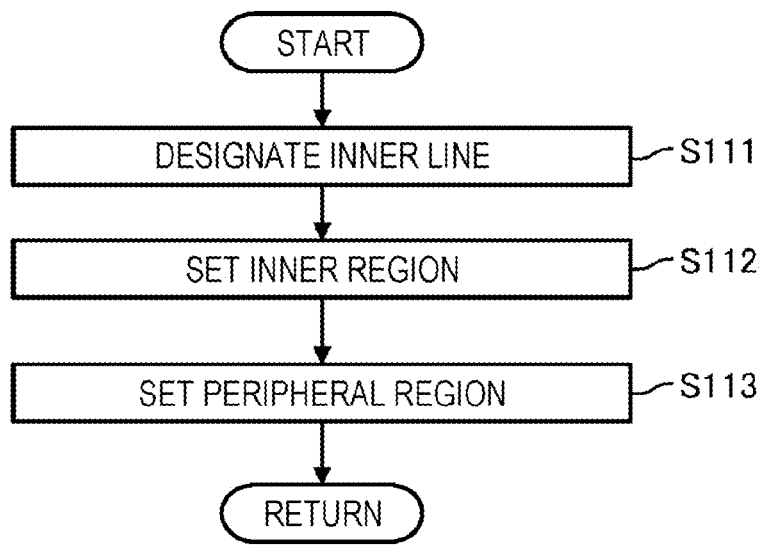
FIG. 5 is a flowchart illustrating a detailed procedure of region setting processing of setting an inner region and a peripheral region.
Figure 6:
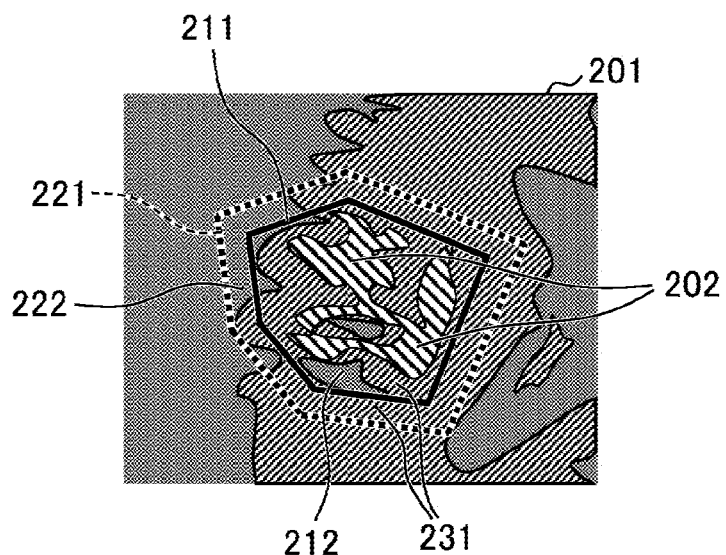
FIG. 6 is a diagram illustrating an example of the inner region and the peripheral region.

FIG. 5 is a flowchart illustrating a detailed procedure of region setting processing of setting the inner region 212 and the peripheral region 222 in step S110 of FIG. 4. FIG. 6 is a diagram illustrating an example of the inner region 212 and the peripheral region 222.

FIG. 6 illustrates a medical image 201 related to a brain.

First, a user designates an inner line 211 in the medical image 201 that is a first image (S111 of FIG. 5). The inner line 211 illustrated as a thick solid line is designated as a line surrounding a region that includes all region (region of interest) 202 considered to be a lesion in the medical image 201. The inner line 211 may be designated by the user dragging the mouse or clicking a plurality of points with the mouse. In the latter case, the region setting unit 102 may use said points (obtained through clicking) as vertices and use a line connecting said points as the inner line 211. Note that a region inside the inner line 211 is referred to as the inner region 212. In this manner, the region setting unit 102 sets the inner region 212 in the medical image 201 (S112 of FIG. 5). In this manner, the inner region 212 is set as a region that includes the region 202 considered as the lesion. Further, the inner region 212 is set in the medical image 201 by setting the inner line 211 via the input device 131.

Subsequently, the region setting unit 102 sets the peripheral region 222 on the basis of the inner line 211 (S113 of FIG. 5). Specifically, the region setting unit 102 sets an enlarged region 231 that is x times an area of the inner region 212 (x is a real number satisfying x>1). Then, the region setting unit 102 sets an outline of the enlarged region 231 as an outer line 221. In the example of FIG. 6, a case where x=1.2 is illustrated. However, a value of x is not limited to 1.2. Note that the value of x is preset by the user via the input device 131.

Then, the region setting unit 102 sets a region between by the outer line 221 and the inner line 211 as the peripheral region 222 in the medical image 201. As described above, the peripheral region 222, which is the second region, is a region in the vicinity of the inner region 212, which is the first region, and is set by the region setting unit 102 as a region that does not include the region 202 considered as the lesion and the inner region 212.

Calculation of Intensity Value Group Ratio Distribution: S120 of FIG. 4

Next, calculation of the intensity value group ratio distribution in step S120 of FIG. 4 will be described with reference to FIG. 8 while referring to FIG. 7.

Figure 7:
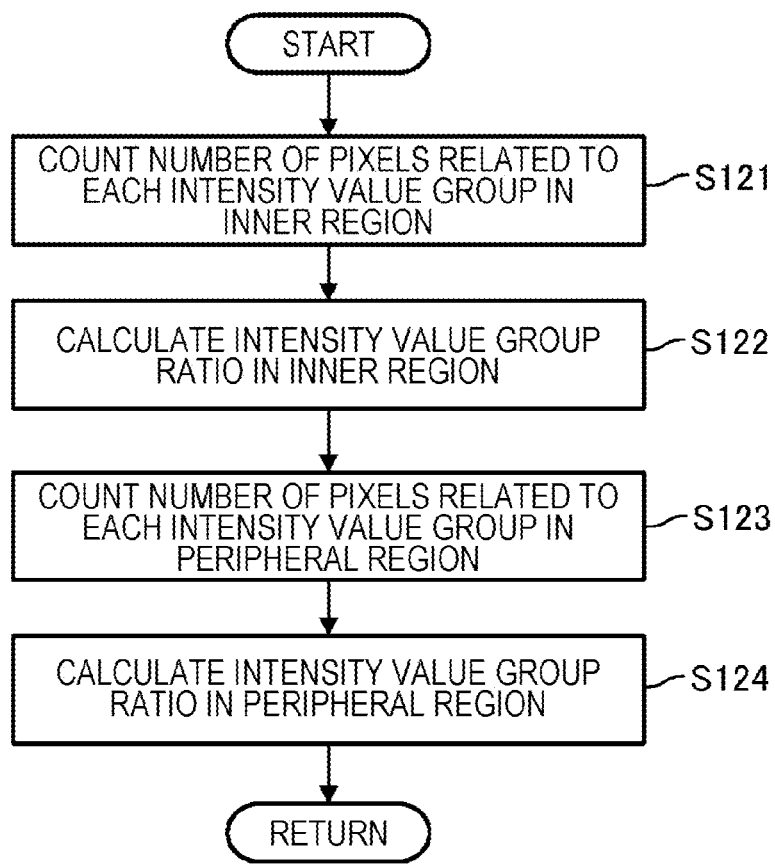
FIG. 7 is a flowchart illustrating a detailed procedure for calculating intensity value group ratio distribution.

FIG. 7 is a flowchart illustrating a detailed procedure for calculating the intensity value group ratio distribution in step S120 of FIG. 4. Further, FIG. 8 is a diagram illustrating an example of the intensity value group ratio distribution in the inner region 212 and the peripheral region 222. The intensity value group ratio distribution will be described later. FIGS. 2 and 6 will be appropriately referred to.

In FIG. 8, the horizontal axis represents the intensity value group, and the vertical axis represents the intensity value group ratio. Further, in FIG. 8, the histogram 301 shown using black bars indicates the intensity value group ratio in the inner region 212. Furthermore, the histogram 302 shown using hatched bars indicates the intensity value group ratio in the peripheral region 222. The intensity value group ratio will be described later.

Hereinafter, definition of the intensity value group will be described. In the present embodiment, a group of a plurality of intensity values is referred to as the intensity value group. For example, each of "0 to 31", "32 to 63", . . . , "960 to 991", and "992 to 1023" is referred to as the intensity value group (predetermined intensity value). Further, in the present embodiment, the intensity value group corresponding to "n to m" (n and m are natural numbers including 0) is referred to as an intensity value group "m+1". For example, the intensity value group corresponding to the intensity values "0 to 31" is described as an intensity value group "32".

In order to generate the intensity value group ratio distribution as illustrated in FIG. 8, first, the intensity value group ratio distribution calculation unit 103 counts the number of pixels (pixel count: the number of pixels having a predetermined intensity value) related to each intensity value group for the inner region 212 (S121 of FIG. 7). For example, the intensity value group ratio distribution calculation unit 103 counts the number "n1" of pixels having intensity values "672" to "703" (an intensity value group "704") in the inner region 212.

Then, the intensity value group ratio distribution calculation unit 103 divides the number of pixels of each intensity value group by a total number of pixels of the inner region 212 (the number of pixels constituting the inner region 212). Thus, the intensity value group ratio distribution calculation unit 103 calculates a ratio (referred to as the intensity value group ratio) of pixels having each intensity value group in the inner region 212 (S122 of FIG. 7). For example, it is assumed that the total number of pixels included in the inner region 212 is "N1", and the number of pixels having the intensity value group "704" in the inner region 212 is "n1". In this case, the intensity value group ratio of the intensity value group "704" in the inner region 212 is "n1/N1". The intensity value group ratio calculated in this way is shown as a black bar of the histogram 301 at the intensity value group "704" in FIG. 8. The intensity value group ratio distribution calculation unit 103 calculates the intensity value group ratios for all the target intensity value groups in the inner region 212 to calculate the histogram (distribution of intensity value ratios, first intensity value frequency distribution that is information related to distribution of the number of pixels having a predetermined intensity value) 301 shown using black bars as illustrated in FIG. 8.

In the present embodiment, the histogram 301 is illustrated by the intensity value group ratio. If the total number of pixels of the inner region 212 and the peripheral region 222 are the same, the histogram 301 may simply be illustrated by the number of pixels ("n1" in the above example) of each intensity value group. Note that, by illustrating the histogram 301 by the intensity value group ratio instead of the simple number of pixels, even when the total number of pixels in the inner region 212 is different to the total number of pixels in the peripheral region 222, the subsequent processing may be performed. The same applies to the histogram 302 to be described later.

The intensity value group ratio distribution calculation unit 103 also calculates the intensity value group ratio for the peripheral region 222 by the same procedure. The intensity value group ratio distribution calculation unit 103 counts the number of pixels (pixel count: the number of pixels having a predetermined intensity value) related to each intensity value group for the peripheral region 222 (S123 of FIG. 7). For example, the intensity value group ratio distribution calculation unit 103 counts the number "n2" of pixels having intensity values "256" to "287" (an intensity value group "288") in the peripheral region 222.

Then, the intensity value group ratio distribution calculation unit 103 divides the number of pixels of each intensity value group by the total number of pixels of the peripheral region 222 (the number of pixels constituting the peripheral region 222). Thus, the intensity value group ratio distribution calculation unit 103 calculates a ratio (referred to as the intensity value group ratio) of pixels having each intensity value group in the peripheral region 222 (S124 of FIG. 7). For example, it is assumed that the total number of pixels included in the peripheral region 222 is "N2", and the number of pixels having the intensity value group "288" in the peripheral region 222 is "n2". In this case, the intensity value group ratio of the intensity value group "288" in the peripheral region 222 is "n2/N2". The intensity value group ratio calculated in this way is shown as a hatched bar of the histogram 302 at the intensity value group "288" in FIG. 8. The intensity value group ratio distribution calculation unit 103 calculates the intensity value group ratios for all the target intensity value groups in the peripheral region 222 to calculate the histogram (distribution of intensity value ratios, second intensity value frequency distribution that is information related to distribution of the number of pixels having a predetermined intensity value) 302 indicated by hatched bars as illustrated in FIG. 8.

Note that in FIG. 8, a bin (an interval in the histograms 301 and 302) is set to "32", but the bin is not limited to "32". Incidentally, when the bin is "1", the intensity value group and the intensity value match. After completion of step S124 of FIG. 7, the computer 100 returns the processing to step S130 of FIG. 4.

Calculation of Ratio Difference: S130 of FIG. 4

Next, calculation of the ratio difference in step S130 of FIG. 4 will be described with reference to FIG. 9. Further, FIG. 2 will be appropriately referred to.

Figure 9:
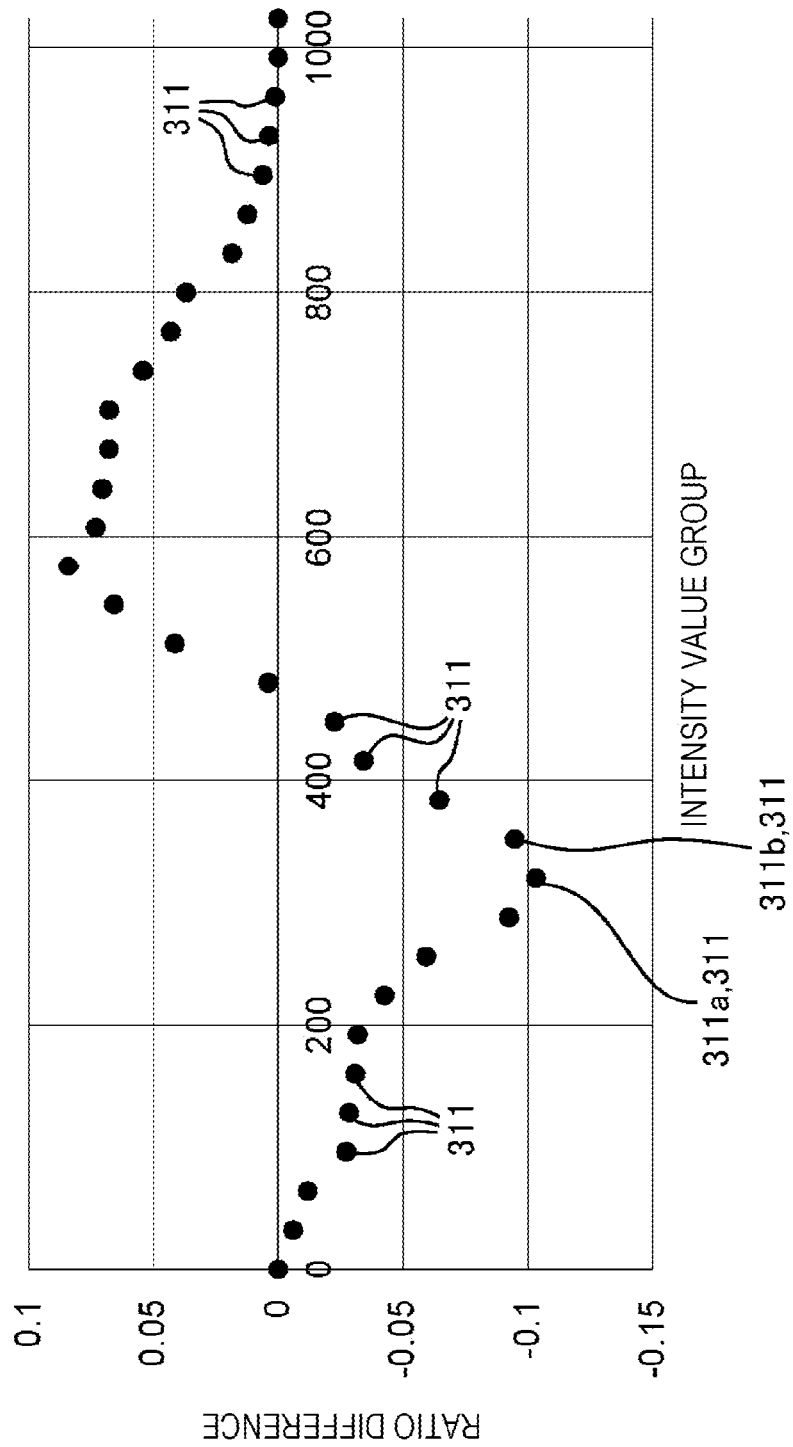
FIG. 9 is a diagram illustrating an example of a ratio difference.

FIG. 9 is a diagram illustrating an example of the ratio difference.

The ratio difference calculation unit 104 calculates the ratio difference, which is a difference between the intensity value ratio in the histogram 301 illustrated in FIG. 8 and the intensity value ratio in the histogram 302 illustrated in FIG. 8, for each intensity value group. That is, the ratio difference calculation unit 104 subtracts the intensity value group ratio (histogram 302 shown by hatched bars in FIG. 8) of the peripheral region 222 (see FIG. 6) from the intensity value group ratio (histogram 301 shown by black bars in FIG. 8) of the inner region 212 (see FIG. 6) for each intensity value group of the intensity value group ratio distribution illustrated in FIG. 8. Through such processing, the ratio difference illustrated in FIG. 9 is calculated.

In FIG. 9, the horizontal axis represents the intensity value group, and the vertical axis represents the ratio difference. Further, in FIG. 9, plotted points 311 indicate the ratio difference in each intensity value group. Note that reference numerals 311a and 311b will be described later.

Calculation of Ratio Difference Rank Distribution 330b to Determination of Intensity Value: S140 to S160 of FIG. 4

Next, processing in steps S140 to S160 of FIG. 4 will be described with reference to FIGS. 11 and 12 while referring to FIG. 10.

Figure 10:
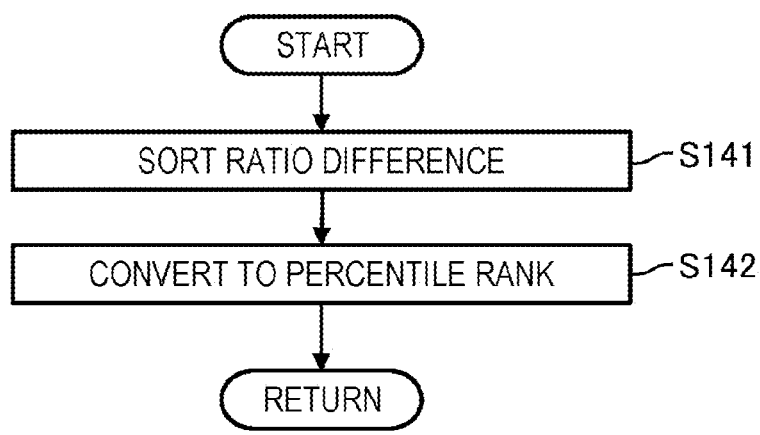
FIG. 10 is a flowchart illustrating a detailed procedure for calculating a ratio difference rank distribution.

FIG. 10 is a flowchart illustrating a detailed procedure of calculating the ratio difference rank distribution 330b (see FIG. 12) in step S140 of FIG. 4.

First, the rank distribution calculation unit 105 sorts the ratio differences (assigns ranks to values of the ratio differences, and arranges the predetermined intensity values according to the ranks: S141 of FIG. 10). In the present embodiment, the ratio differences are sorted in ascending order, but may be sorted in descending order.

Figure 11:
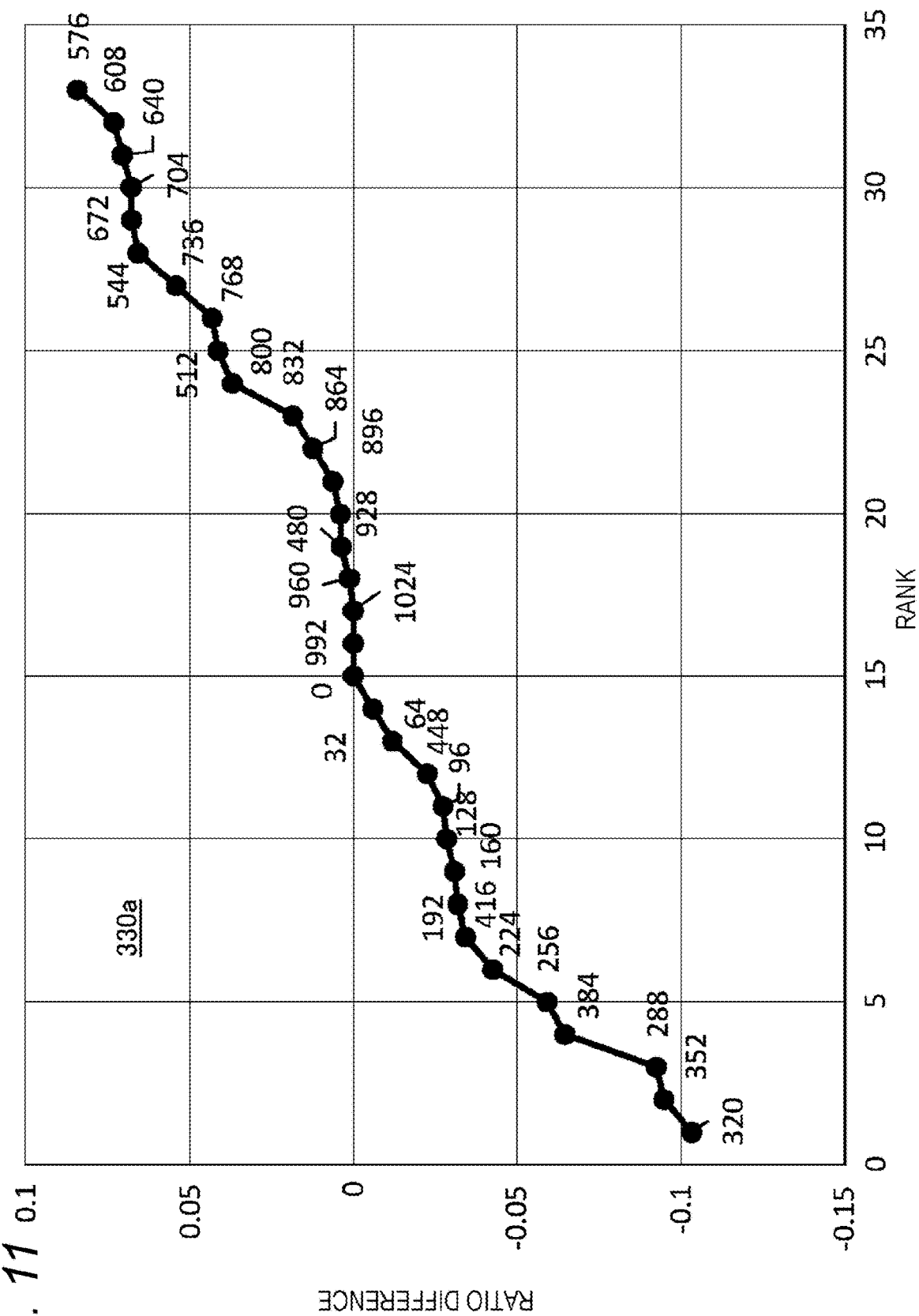
FIG. 11 is a diagram illustrating an ascending sort result of the ratio difference.

FIG. 11 is a diagram illustrating an ascending sort result of the ratio difference.

In FIG. 11, the horizontal axis represents the rank, and the vertical axis represents the ratio difference. Further, numbers that are respectively given to plotted points in FIG. 11 indicate the corresponding intensity value groups (that is, values of the horizontal axis of FIG. 9).

For example, the intensity value group having the smallest ratio difference in the ratio difference illustrated in FIG. 9 is an intensity value group "320" whose ratio difference is about "−0.1" (the plotted point 311a in FIG. 9). The intensity value group having the next smallest ratio difference is an intensity value group "352" whose ratio difference is about "−0.09" (the plotted point 311b in FIG. 9). The rank distribution calculation unit 105 plots the intensity value group "320" in a graph of FIG. 11 as having the ratio difference of the lowest rank (that is, rank "1"), and plots the intensity value group "352" in the graph of FIG. 11 as having the ratio difference of the next lowest rank (that is, rank "2"). FIG. 11 illustrates a graph in which the rank of the intensity value group and the ratio difference are associated, with points plotted in ascending order of the ratio difference of the intensity value group (in other words, starting from the intensity value group with the small ratio difference). Note that when there are a plurality of intensity value groups having the same ratio difference, the rank of the intensity value group with a smaller value is made lower. The graph illustrated in FIG. 11 is referred to as a ratio difference rank distribution (difference rank distribution) 330a.

As illustrated in FIG. 8, since the number of intensity value groups is 33 in the example illustrated in the present embodiment, ranks from "1" to "33" are shown in an example illustrated in FIG. 11. Incidentally, in the example illustrated in FIG. 11, the rank "1" is the rank of the intensity value group having the smallest ratio difference, and the rank "33" is the rank of the intensity value group having the largest ratio difference.

Subsequently, the rank distribution calculation unit 105 converts the ranks indicated by the horizontal axis of FIG. 11 into percentile ranks (S142 of FIG. 10). FIG. 12 is a diagram in which the horizontal axis of the diagram illustrating the ascending sort of the ratio difference illustrated in FIG. 11 is converted into a percentile rank. The percentile rank is normalized such that the minimum rank is "0" and the maximum rank is "1" with respect to the rank illustrated in FIG. 11. By setting the horizontal axis to the percentile rank, a cumulative percentage of a rank of each ratio difference is shown when the ratio differences are arranged from the smallest to the largest. Note that numbers respectively given to plotted points in FIG. 12 indicate the intensity value groups as in FIG. 11. In an example illustrated in FIG. 12, to obtain the percentile rank, each rank indicated on the horizontal axis of FIG. 11 is subtracted by the minimum rank "1", and each rank is divided by "32" obtained by subtracting "1" from the largest rank.

The inner region 212 (see FIG. 6) and the peripheral region 222 (see FIG. 6) have different ranges for each user selection. That is, total numbers of pixels and intensity values included in the inner region 212 and the peripheral region 222 can differ for each user selection. Then, if the horizontal axis remains as the rank illustrated in FIG. 11, a maximum value of the rank is different for each user selection. Alternatively, the maximum value of the rank can also vary depending on setting of the bin illustrated in FIG. 8. By setting the horizontal axis to the percentile rank, normalization is performed, and even when the total numbers of pixels and intensity values included in the inner region 212 and the peripheral region 222, the setting of the bin, and the like are different for each user selection, processing of the intensity value determination unit 107 described later can be quantified.

Figure 12:
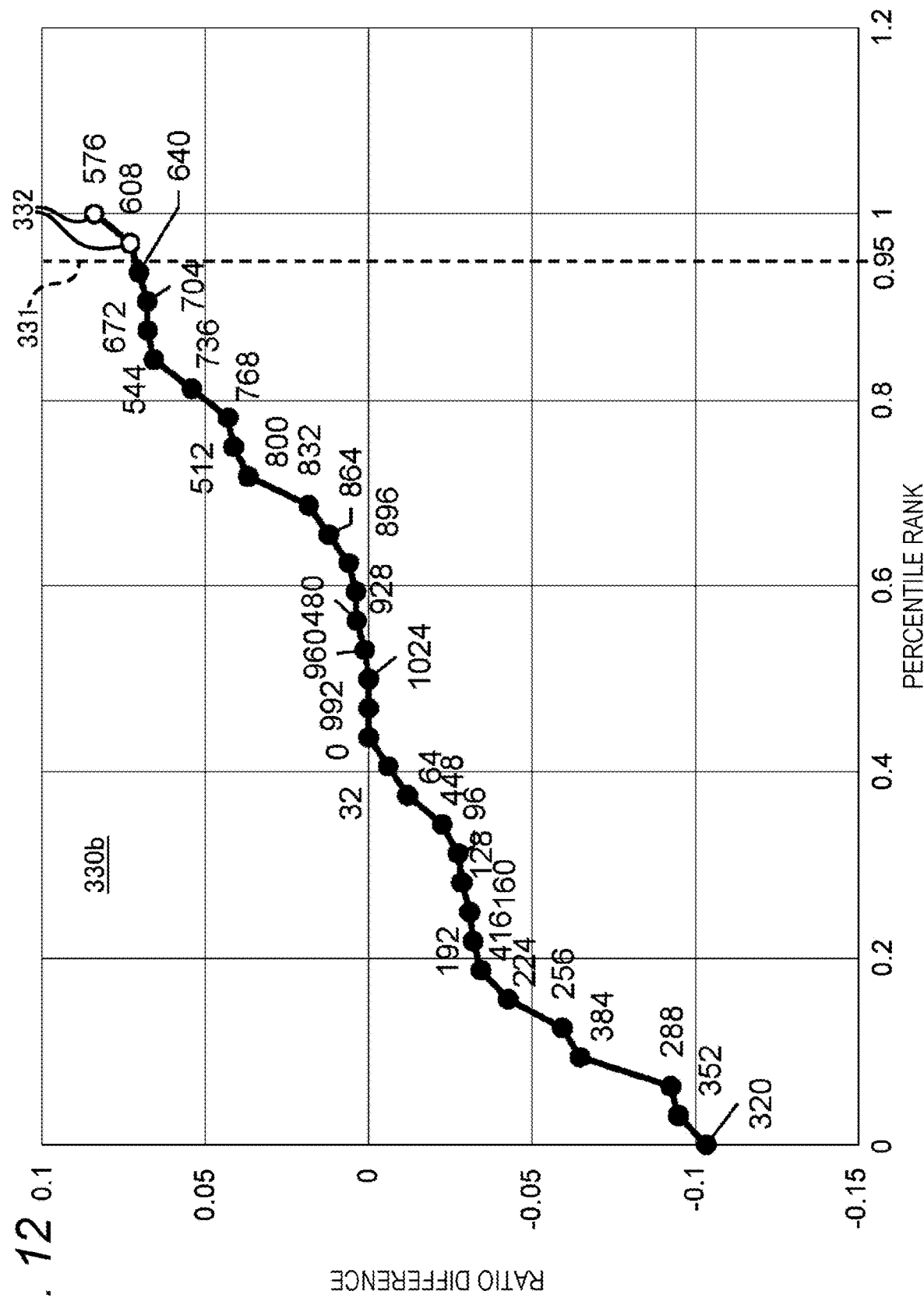
FIG. 12 is a diagram in which the horizontal axis is converted into a percentile rank.

As illustrated in FIG. 12, a graph in which the horizontal axis represents the percentile rank and the vertical axis represents the ratio difference is referred to as the ratio difference rank distribution (ratio difference rank distribution obtained by converting the rank into the percentile rank) 330b. By calculating such a ratio difference rank distribution 330b, it is possible to quantitatively search for an intensity value group having a large ratio difference and, conversely, an intensity value group having a small ratio difference.

Subsequently, the threshold setting unit 106 sets a predetermined threshold for the percentile rank (rank of the ratio difference rank distribution) of the ratio difference rank distribution 330b (step S151 of FIG. 4). A broken line 331 illustrated in FIG. 12 is the threshold that is set. In the example illustrated in FIG. 12, the threshold is set as a percentile rank "0.95". Note that the threshold is preset by the user. Further, in the present embodiment, the threshold is set for the ratio difference rank distribution 330b in which the rank has been converted into the percentile rank, but the threshold may be set for the rank of the ratio difference rank distribution 330a.

Subsequently, the intensity value determination unit 107 extracts an intensity value group having a percentile rank equal to or higher than the threshold. Thus, the intensity value determination unit 107 extracts the intensity value to be highlighted on the basis of the threshold set in the ratio difference rank distribution 330b. In the example illustrated in FIG. 12, since the threshold is "0.95", the intensity value group whose percentile rank is in the top 5% is extracted. In the example illustrated in FIG. 12, intensity value groups "608" and "576" are extracted as the intensity value groups having a percentile rank equal to or higher than the threshold (indicated by white circles 332 in FIG. 12). Then, the intensity value determination unit 107 selects the smallest intensity value group among the extracted intensity value groups. In the example illustrated in FIG. 12, the intensity value group "576" is selected.

Determination of Intensity Value to be Highlighted

Figure 13:
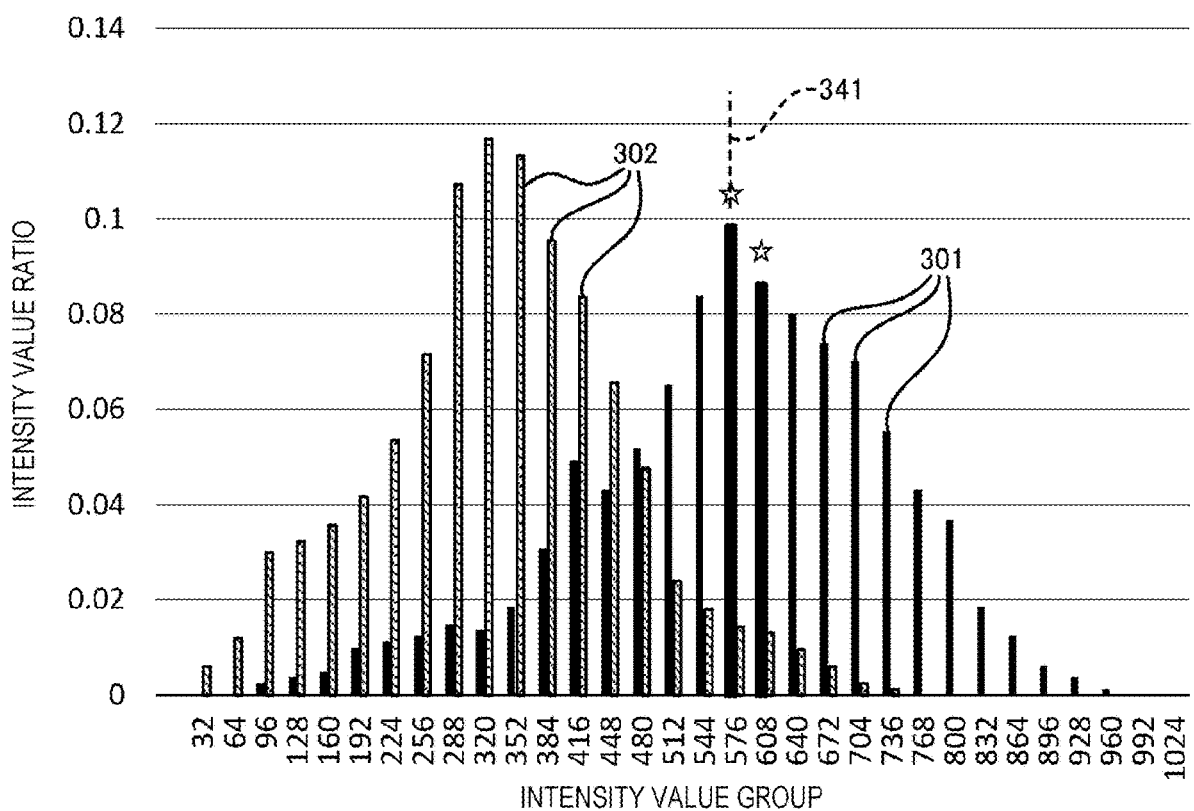
FIG. 13 is a diagram illustrating an example of the intensity value group ratio distribution.

FIG. 13 is a diagram illustrating an example of the intensity value group ratio distribution illustrated in FIG. 8.

In FIG. 13, the intensity value groups indicated by a star sign are the intensity value groups having a percentile rank equal to or higher than the threshold (broken line 331) in FIG. 12. As described above, the intensity value determination unit 107 selects the minimum intensity value group among the intensity value groups having a percentile rank equal to or higher than the threshold. A broken line 341 in FIG. 13 indicates the intensity value group "576" selected as the minimum intensity value group among the intensity value groups having a percentile rank equal to or higher than the threshold. Then, the intensity value determination unit 107 selects an intensity value (that is, an intensity value of "577" or more) that is larger than a value ("576") of the selected intensity value group "576" in the inner region 212 (see FIG. 4) (step S160 of FIG. 4). In this way, an intensity value to be highlighted is determined. A pixel having the determined intensity value is the pixel to be highlighted.

Highlighting

Figure 14:
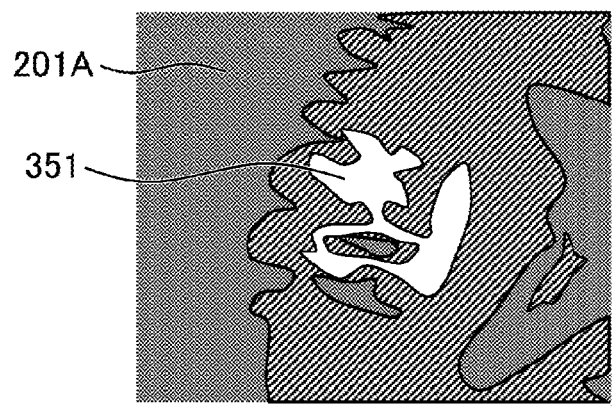
FIG. 14 is a diagram illustrating a result of lesion highlighting processing according to the present embodiment.

FIG. 14 is a diagram illustrating a result of lesion highlighting processing according to the present embodiment.

FIG. 14 illustrates the medical image (second image) 201A that is the result of lesion highlighting processing according to the present embodiment. In the medical image 201A, pixels having an intensity value equal to or greater than the intensity value "577" selected in FIG. 13 are highlighted as indicated by reference numeral 351. That is, the display processing unit 108 determines the pixel to be highlighted on the basis of the intensity value determined by the intensity value determination unit 107, and displays the medical image 201A in which said pixel is highlighted on the display device 132.

Display Screen 400

An example of a display screen 400 that is displayed on the display device 132 in the present embodiment will be described with reference to FIG. 15. FIGS. 2 and 4 will be appropriately referred to.

Figure 15:
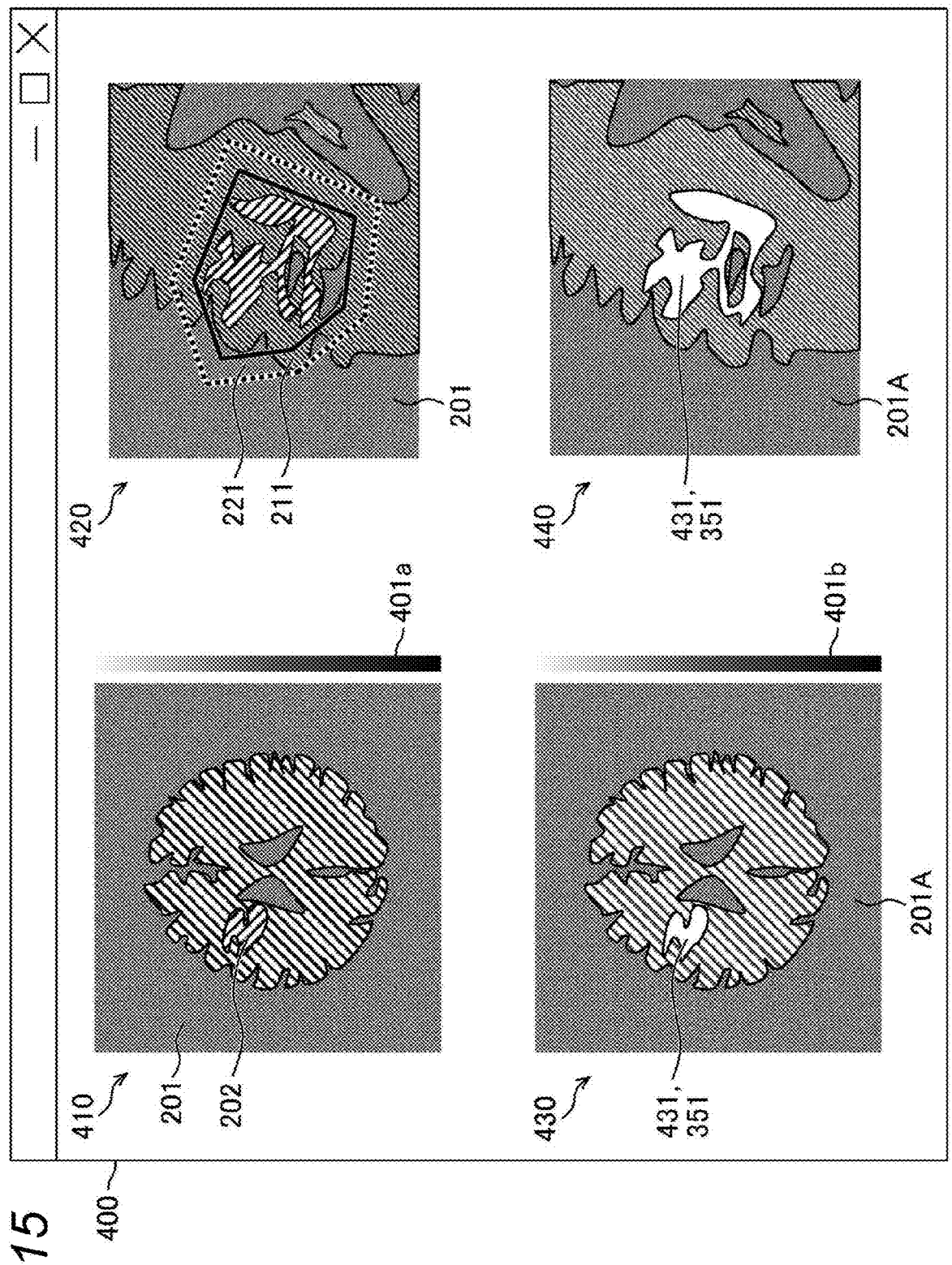
FIG. 15 is a diagram illustrating an example of a display screen displayed on a display device in an embodiment.

FIG. 15 is a diagram illustrating an example of the display screen 400 displayed on the display device 132 (see FIG. 1) in the present embodiment. FIG. 2 will be appropriately referred to.

The display screen 400 includes screens 410, 420, 430, and 440.

The screen 410 displays the medical image 201 that is read in step S101 and displayed in step S102 of FIG. 4.

A place suspected as a lesion is displayed in the region 202. Further, a color bar 401a corresponds to the intensity value on the screen 410.

The screen 420 is a screen that is displayed during the processing of step S110 of FIG. 4.

The user enlarges a place considered as the lesion in the medical image 201 displayed on the screen 410 to display the screen 420 on which the enlarged medical image 201 is displayed. Then, as described above, the user sets the inner line 211 on the screen 420, and the region setting unit 102 sets the outer line 221 on the basis of the inner line 211.

Note that the inner line 211 and the outer line 221 displayed on the screen 420 have already been described with FIG. 6, and thus description thereof is omitted here.

The screen 430 and the screen 440 display the medical image 201A that is a result of performing the lesion highlighting processing of the present embodiment.

The screen 430 displays an entire image of the medical image 201A, and the screen 440 displays an enlarged image of the lesion and the vicinity thereof in the medical image 201A.

On the screen 430 and the screen 440, a lesion 431 is highlighted. The lesion 431 that is highlighted is a portion corresponding to pixels denoted by reference numeral 351 in FIG. 14.

Further, a color bar 401b of the screen 430 corresponds to the intensity value on the screen 430.

Note that, as described above, the screen 410 is a screen that is displayed at a stage of step S102 of FIG. 4; the screen 420 is a screen that is displayed at a stage of step S110 of FIG. 4; the screens 430 and 440 are screens that are displayed at a stage of step S171 of FIG. 4.

In addition, the color bars 401a and 401b may be displayed on the screen 420 and the screen 440.

In this way, the screen 410 displaying the medical image 201 before the lesion highlighting processing is performed and the screens 430 and 440 displaying the medical image 201A after the lesion highlighting processing is performed are displayed on the same display screen 400 (in the same screen). Providing such a display enables the user to compare the medical images 201 and 201A before and after the lesion highlighting processing is performed.

Figure 16:
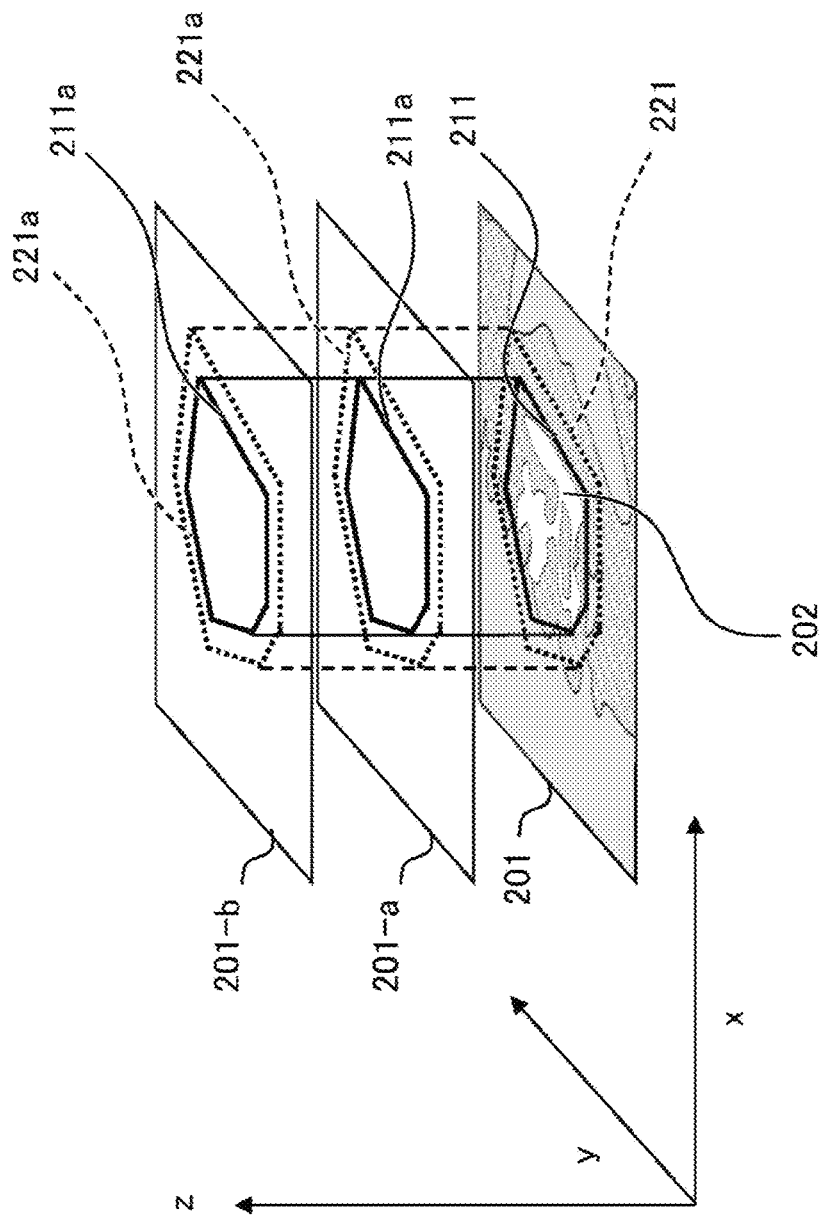
FIG. 16 is a diagram illustrating an example of three-dimensional image processing.

After checking the result of the screen 430 and the screen 440, the user may save the medical image 201A displayed on the screen 430 and the screen 440 together with a disease name or the like as lesion data. Note that, although processing of a two-dimensional image (for example, a two-dimensional image spreading across an x-axis-y-axis plane) has been described in the present embodiment, the processing can be extended to three dimensions by using the same inner line 211 for each of a plurality of two-dimensional images (slice images) adjacent in a z-axis direction. FIG. 16 illustrates an example of the medical image 201 illustrated in FIG. 6, a medical image 201-a (another medical image) adjacent to the medical image 201 in the z-axis direction, and a medical image 201-b (another medical image) adjacent to the medical image 201-a in the z-axis direction. In addition, the region 202 illustrated in FIG. 6, the inner line 211 set by the user, and the outer line 221 obtained by extending the length of the inner line are illustrated on the medical image 201. Here, the region setting unit 102 sets the inner line 211 and the outer line 221 set in the medical image 201 to the medical image 201-a, which is adjacent to the medical image 201 in the z-axis direction, and the medical image 201-b, which is adjacent to the medical image 201-a in the z-axis direction, (an inner line 211a and an outer line 221a), making it possible for a three-dimensional image to be processed by designating an inner line 211 in a single, two-dimensional image (medical image 201).

An object of the disclosure is to emphasize a region of interest with high accuracy by simple processing.

According to the disclosure, it is possible to emphasize a region of interest with high accuracy by simple processing.

The present embodiment proposes a technique in which a region range that is selected by a user as corresponding to a lesion is received as an input, and the lesion within a designated range is highlighted by simple processing that includes comparing intensity distributions of the selected range and a peripheral region of the selected range. With such a technique, it is possible to simplify a specialized viewpoint and complicated work in obtaining a highlighted image of the lesion.

In a technique described in Non-Patent Literature 1 (Xue, Y., et al., "A multi-path 2.5 dimensional convolutional neural network system for segmenting stroke lesions in brain MRI images", NeuroImage: Clinical 25, 102118 [2020]), accuracy of lesion determination is 54% in terms of dice coefficient. The dice coefficient is obtained by calculating how similar sample data is to a set of correct answers (teacher data) with these coefficients (performed with each sample data) and averaging the calculation results of all sample data to obtain accuracy. In contrast, according to the present embodiment, the lesion is highlighted with sensitivity of 91.7% accuracy. The sensitivity is defined by TP/P. Here, P is the number of pixels of a true lesion (set of correct answers), and TP (true positive) is the number of pixels determined to be the lesion by an algorithm among a set of pixels of the true lesion.

In addition, in Non-Patent Literature 1 (Xue, Y., et al. "A multi-path 2.5 dimensional convolutional neural network system for segmenting stroke lesions in brain MRI images", NeuroImage: Clinical 25, 102118 [2020]), determination of the lesion by learning is performed by CNN, that is, machine learning. Generally, a large amount of learning data is required to perform machine learning. The present embodiment does not use machine learning and does not require a large amount of learning data for machine learning. In the present embodiment, by receiving designation of a lesion corresponding region from a user, marking of the lesion with high accuracy is possible.

The present embodiment describes highlighting a bright place in the medical image 201, but a dark place may be highlighted instead. In this case, the threshold setting unit 106 sets the threshold (broken line 331 in FIG. 12), which is set in step S151 of FIG. 4, to, for example, "0.05" and selects an intensity value group having a maximum percentile rank among intensity value groups having a percentile rank equal to or lower than the threshold. Then, the display processing unit 108 highlights a pixel having an intensity value smaller than the value of the selected intensity value group.

In addition, the threshold setting unit 106 may set two thresholds in step S151 of FIG. 4. In this case, the intensity value determination unit 107 selects a first intensity value group having a minimum percentile rank among intensity value groups having a percentile rank equal to or higher than a threshold (for example, "0.95"). Then, the display processing unit 108 highlights a pixel (referred to as a bright pixel) having an intensity value greater than the value of the selected, first intensity value group. The intensity value determination unit 107 also selects a second intensity value group having a maximum percentile rank among intensity value groups having a percentile rank equal to or lower than another threshold (for example, "0.05"). Then, the display processing unit 108 highlights a pixel (referred to as a dark pixel) having an intensity value smaller than the value of the selected, second intensity value group. Then, the display processing unit 108 highlights the bright pixel and the dark pixel on the same medical image 201A. In this way, it is possible to highlight both a bright portion and a dark portion of the medical image 201.

By highlighting the bright pixel and the dark pixel on the same medical image 201A, it is possible to simultaneously highlight lesions caused by two types of diseases. The user may add attribute data such as a disease name to the medical image 201A with highlights and store the medical image in the storage device (storage) 120.

In FIG. 15, the images taken using the same medical device are displayed, but images taken using different medical devices (for example, X-ray CT and MRI, or the like) may be displayed on the same display screen 400. Further, images taken at different positions of the same patient may be displayed on the same display screen 400.

Furthermore, the peripheral region 222 and the inner region 212, which are adjacent to each other in the present embodiment, may be set at positions separated from each other.

The disclosure is not limited to the above-described embodiments, and includes various modifications. For example, the above-described embodiments have been described in detail for ease of understanding of the disclosure, but the disclosure is not limited to embodiments having all the described configurations. Further, a part of configuration of a certain embodiment may be replaced with a configuration of another embodiment, and a configuration of another embodiment may be added to a configuration of a certain embodiment. Furthermore, a part of configuration of each embodiment may be added, deleted, or replaced with another configuration.

Further, some or all of the above-described configurations, functions, units 101 to 108, storage device (storage) 120, and the like may be implemented by hardware, for example, by designing with an integrated circuit. Further, as illustrated in FIG. 3, each of the above-described configurations, functions, or the like may be implemented through software by using a processor (such as a CPU 112) to interpret and execute a program for realizing each function. Information such as a program, table, and/or file for realizing each function may be stored not in a hard disk drive (HDD) but in a storage device, such as a memory 111 or a solid state drive (SSD), or a non-transitory storage medium, such as an integrated circuit (IC) card, a secure digital (SD) card, or a digital versatile disc (DVD).

Furthermore, in each embodiment, control lines and information lines considered to be necessary for description are illustrated, and not all control lines and information lines in a product are necessarily illustrated. In practice, it may be considered that almost all the configurations are connected to each other.

What is claimed is:

1. An image processing apparatus comprising:
a memory that stores a first image;
a processor communicatively coupled to the memory and a display, wherein the processor is programmed to:
identify a first region in the first image that includes a region of interest;
identify a second region in the first image that is adjacent to the first region and that excludes the region of interest and the first region;
calculate a first intensity value frequency distribution for the first region and a second intensity value frequency distribution for the second region, each distribution representing a number of pixels having respective predetermined intensity values across a plurality of predetermined intensity value ranges;
calculate, for each of the plurality of predetermined intensity values, a difference value between the first and second intensity value frequency distributions;
based on the difference value, one or more pixels in the first image to be highlighted;
display a second image in which the selected one or more pixels are highlighted relative to the first image;
assign ranks to the difference values and arrange the plurality of predetermined intensity values based on the assigned ranks to generate a difference rank distribution;
apply a threshold to the ranks in the difference rank distribution to determine an intensity value to be highlighted; and
select the one or more pixels in the first image based on the determined intensity value;
wherein the display is configured to render the second image in which the one or more pixels corresponding to the determined intensity value are highlighted.

2. The image processing apparatus of claim 1, wherein the processor is further programmed to convert the ranks into percentile ranks and to apply the threshold percentile threshold.

3. The image processing apparatus of claim 1, wherein:
the processor is further programmed to:
calculate the first intensity value frequency distribution as a distribution of intensity value ratios for the first region, each ratio being obtained by dividing a number of pixels in the first region having a predetermined intensity value by a total number of pixels in the first region and;
calculate the second intensity value frequency distribution as a distribution of intensity value ratios for the second region, each ratio being obtained by dividing a number of pixels in the second region having the predetermined intensity value by a total number of pixels in the second region; and
calculate each difference value
as a difference between the corresponding intensity value ratios in the first and second intensity value frequency distributions.

4. The image processing apparatus of claim 1, wherein the display is configured to display the first image and the second image on a same screen.

5. The image processing apparatus of claim 1, further comprising an input device configured to receive a user selection of the first region.

6. The image processing apparatus of claim 1, wherein:
the first image is a two-dimensional image extending along an x-axis and a y-axis; and
the processor is further programmed to apply the first and second regions to another image adjacent to the first image along a z-axis direction.

7. A method of image processing, comprising:
storing, in a memory, a first image;
identifying, by a processor, a first region in the first image that includes a region of interest and a second region in the first image that is adjacent to the first region and that excludes the region of interest and the first region;
calculating, by the processor, a first intensity value frequency distribution for the first region and a second intensity value frequency distribution for the second region, each distribution representing a number of pixels having respective predetermined intensity values across a plurality of predetermined intensity value ranges;
calculating, by the processor, for each of the plurality of predetermined intensity values, a difference value between the first and second intensity value frequency distributions;

selecting, by the processor, one or more pixels in the first image to be highlighted based on the difference values;

displaying, on a display, a second image in which the selected one or more pixels are highlighted relative to the first image;

assigning ranks to the difference values and arrange the plurality of predetermined intensity values based on the ranks assigned to generate a difference rank distribution;

applying a threshold to the ranks in the difference rank distribution to determine an intensity value to be highlighted; and selecting the one or more pixels in the first image based on the determined intensity value;

wherein the display is configured to render the second image in which the one or more pixels corresponding to the determined intensity value are highlighted.

* * * * *